(12) United States Patent
Park et al.

(10) Patent No.: US 9,557,865 B2
(45) Date of Patent: Jan. 31, 2017

(54) TOUCH LOCATION SENSING PANEL HAVING IMAGE

(71) Applicant: Samsung Display Co., Ltd, Yongin (KR)

(72) Inventors: Hee Woong Park, Hwaseong-si (KR); Sung Ku Kang, Suwon-si (KR); Jin Hwan Kim, Seoul (KR); Joo-Han Bae, Seongnam-si (KR); Byeong Kyu Jeon, Busan (KR)

(73) Assignee: Samsung Display Co., Ltd., Yongin-si (KR)

( * ) Notice: Subject to any disclaimer, the term of this patent is extended or adjusted under 35 U.S.C. 154(b) by 201 days.

(21) Appl. No.: 14/333,099

(22) Filed: Jul. 16, 2014

(65) Prior Publication Data

US 2015/0123935 A1   May 7, 2015

(30) Foreign Application Priority Data

Nov. 7, 2013  (KR) .......................... 10-2013-0134887

(51) Int. Cl.
*G06F 3/041* (2006.01)
*G06F 3/044* (2006.01)

(52) U.S. Cl.
CPC ..... *G06F 3/044* (2013.01); *G06F 2203/04103* (2013.01)

(58) Field of Classification Search
CPC ............... G06F 3/044; G06F 3/0412; G06F 2203/04103; G06F 3/045; G06F 3/041; G06F 3/0416; G06F 2203/04111; G06F 3/042; G06F 2203/04112; G06F 3/04883; G06F 1/16; G06F 2203/04808; G06F 3/0488; G06F 1/1643; G06F 1/1641; G06F 3/047; G09G 2300/0404; G09G 3/3208; G09G 3/3611; G09G 5/006; G09G 5/18; G09G 2370/16; G09G 3/36; G09G 3/3614; G09G 3/3629; G09G 3/3648; G09G 5/003
USPC .................................................. 345/173–181
See application file for complete search history.

(56) References Cited

U.S. PATENT DOCUMENTS

| 2004/0239644 | A1 | 12/2004 | Nishioka | |
| 2009/0046072 | A1* | 2/2009 | Emig | G06F 3/044 345/173 |
| 2010/0253651 | A1* | 10/2010 | Day | G06F 3/044 345/175 |
| 2012/0052929 | A1 | 3/2012 | Thammasouk et al. | |

(Continued)

FOREIGN PATENT DOCUMENTS

| JP | 2012-048341 | 3/2012 |
| JP | 2013-038067 | 2/2013 |

(Continued)

*Primary Examiner* — Duc Dinh
(74) *Attorney, Agent, or Firm* — H.C. Park & Associates, PLC (57) ABSTRACT

A touch location sensing panel including horizontal location sensing electrodes and vertical location sensing electrodes, which are arranged in two dimensions on one surface of a base layer and are electrically isolated from each other. A conductive layer is formed within the electrode and on at least a part of the electrode. The electrodes are connected to separate channels of a circuit sensing a touch of a user, respectively, and the conductive layer and the sensing electrodes have a difference in color, so that an image is expressed in an entire region of the sensing panel.

10 Claims, 13 Drawing Sheets

(56) References Cited

U.S. PATENT DOCUMENTS

2013/0062182 A1 3/2013 Tokura et al.
2013/0335367 A1* 12/2013 Kim .................... G09G 3/3696
                                                              345/174

FOREIGN PATENT DOCUMENTS

| KR | 10-0592114 | 6/2006 |
|----|------------|--------|
| KR | 10-0773671 | 11/2007 |
| KR | 10-0885730 | 2/2009 |
| KR | 10-1149749 | 6/2012 |

* cited by examiner

TOUCH LOCATION SENSING PANEL HAVING IMAGE

CROSS-REFERENCE TO RELATED APPLICATION

This application claims priority from and the benefit of Korean Patent Application No. 10-2013-0134887, filed on Nov. 7, 2013, which is hereby incorporated by reference for all purposes as if fully set forth herein.

BACKGROUND

Field

Exemplary embodiments of the present invention relate to a touch location sensing panel having an image, and more particularly, to a touch location sensing panel in which an image is displayed on the touch location sensing panel having a single layer structure by using an additional conductive layer.

Discussion of the Background

A method of sensing a touch location is generally classified into a continuous location sensing method and a discrete location sensing method. The continuous location sensing method, which is an analog method, is a method of measuring a continuous change in optical and electrical characteristics and the like exhibited according to a change in a touch location of a user on the panel, and calculating the touch location based on the measured value. In the discrete location sensing method, which may also be referred to as a "matrix" method, a touch of a user generates a voltage in sensing electrodes arranged at a plurality of locations on a panel, and a touch location is recognized.

The continuous location sensing method may delicately sense a touch location, but generally requires a separate processor, or additional hardware, for calculating a touch location. In the discrete location sensing method, although touch location sensing resolution is restricted by the pitch of the sensing electrodes, it is possible to simply obtain information about the touch location by sensing whether or not the touch is generated in a specific sensing electrode, so that the discrete location sensing method has been widely used in various types of digital devices.

Among the various sensing panels adopting the discrete location sensing method, a sensing panel having a structure in which a horizontal location sensing pattern and a vertical location sensing pattern are arranged on a surface of a single layer may advantageously be manufactured at low cost, and have a simple stacked structure, but the sensing pattern may be visible from the outside of a digital device resulting from an optical property deviation according to a difference in transmittance between a pattern portion and a non-pattern portion.

The above information disclosed in this Background section is only for enhancement of understanding of the background of the invention and, therefore, it may contain information that does not constitute prior art.

SUMMARY

Exemplary embodiments of the present invention provide a touch location sensing panel having an improved design such that a sensing pattern is visible from the outside as a result of a difference in transmittance between a pattern portion and a non-pattern portion in a sensing panel using a discrete location sensing method.

Additional features of the invention will be set forth in the description which follows, and in part will be apparent from the description, or may be learned by practice of the invention.

An exemplary embodiment of the present invention discloses a touch location sensing panel, including: horizontal location sensing electrodes and vertical location sensing electrodes disposed in two dimensions on one surface of a base layer and electrically isolated from each other; and a conductive layer formed within each electrode and on at least a part of each electrode. The electrodes are connected to separate channels of a circuit configured for sensing a touch of a user, respectively, and the conductive layer and the sensing electrodes differ in color, so that an image is expressed in an entire region of the sensing panel.

An exemplary embodiment of the present invention also discloses a touch location sensing panel, including horizontal location sensing electrodes and vertical location sensing electrodes, which are disposed in two dimensions on one surface of a base layer and are electrically isolated from each other. The electrodes are connected to separate channels of a circuit sensing a touch of a user, respectively, and at least one of the electrodes has a shape of a letter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which exemplary embodiments of the invention are shown. This invention may, however, may be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the sizes and relative sizes of layers and regions, including the thickness of layers, films, panels, regions, etc., may be exaggerated for clarity.

Like reference numerals designate like elements throughout the specification. It will be understood that when an element such as a layer, film, region, or substrate is referred to as being "on" or "connected to" another element, it can be directly on or directly connected to the other element, or intervening elements may also be present. In contrast, when an element is referred to as being "directly on" or "directly connected to" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Hereinafter, a touch location sensing panel according to an exemplary embodiment of the present invention will be described in detail with reference to the drawings.

Figure 1:
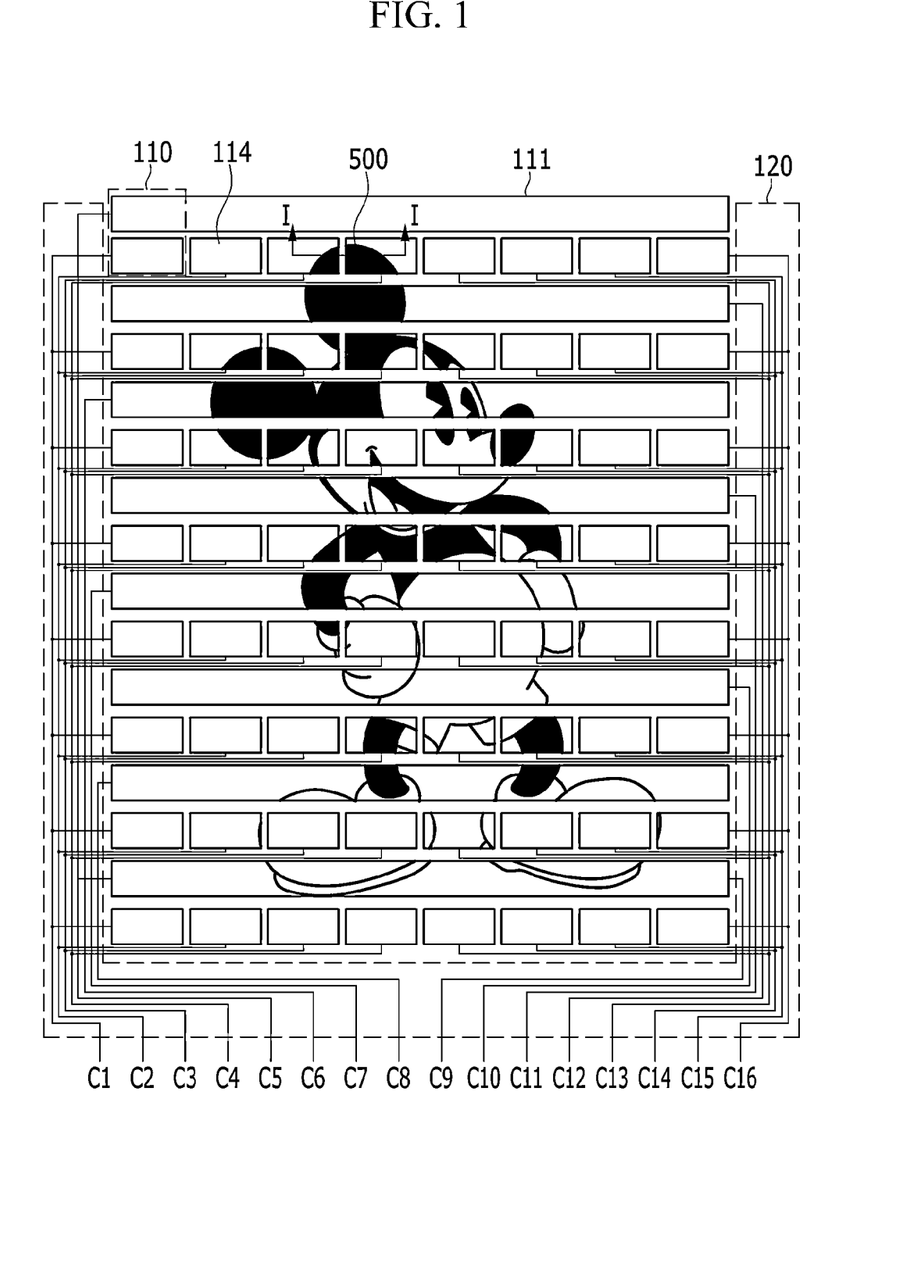
FIG. 1 is a diagram illustrating sensing electrodes of a touch location sensing panel and an image formed on the sensing panel according to an exemplary embodiment of the present invention.
Figure 2:
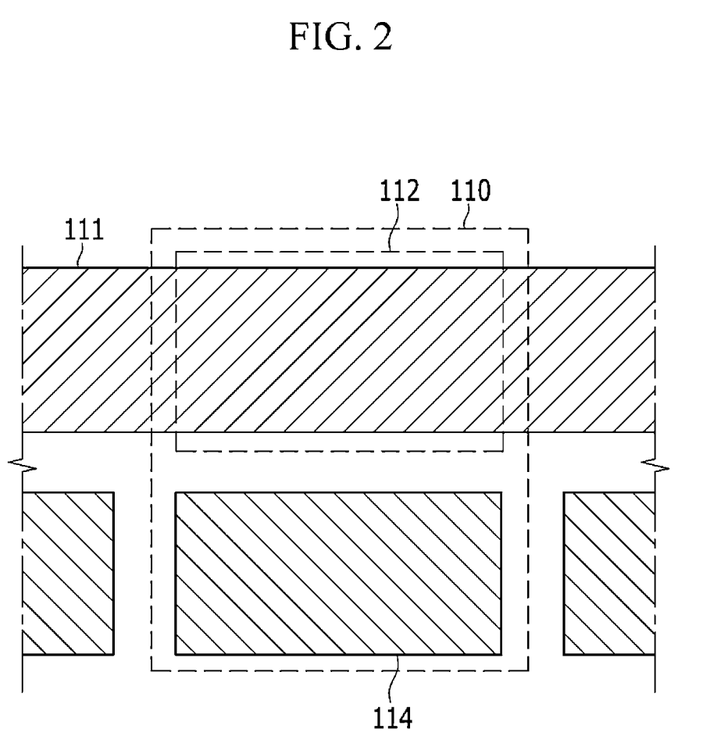
FIG. 2 is an enlarged view illustrating the sensing electrode of FIG. 1.
Figure 3:
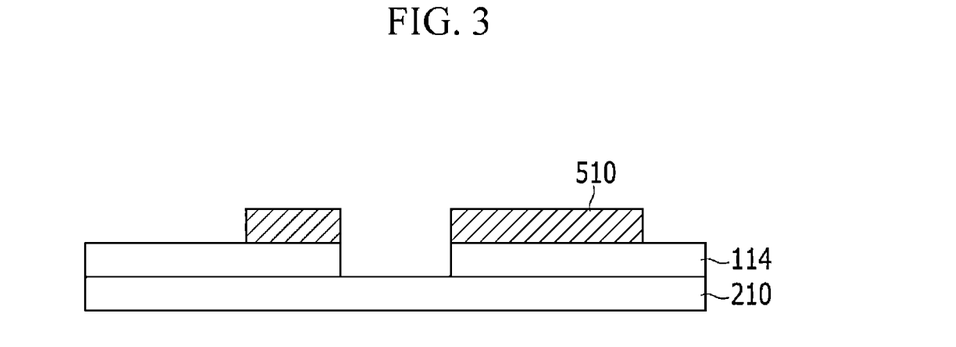
FIG. 3 is a cross-sectional view taken along line I-I of FIG. 1.

Referring to FIGS. 1 to 3, a touch location sensing panel having an image according to an exemplary embodiment of the present invention will be described in detail.

Referring to FIGS. 1 and 3, a sensing pattern having an image includes vertical location sensing electrodes 111 elongated in a horizontal direction at a plurality of vertical locations, horizontal location sensing electrodes 114 adjacent to the vertical location sensing electrodes 111 in parallel, respectively, to be arranged at a plurality of horizontal locations, and an image region 500 expressed through a conductive layer 510 on the vertical location sensing electrodes 111 and the horizontal location sensing electrodes 114.

The vertical location sensing electrodes 111 and the horizontal location sensing electrodes 114 will be described in detail. In a capacitive touch location sensing panel, the vertical location sensing electrodes 111 and the horizontal location sensing electrodes 114 are formed of a conductive material. In a touch screen panel, the vertical location sensing electrodes 111 and the horizontal location sensing electrodes 114 may be formed of a transparent conductive material, such as ITO.

A connecting line pattern 120 indicated by a dotted line in FIG. 1 may be directly formed on a layer on which a sensing region 110 is formed. Alternatively, the connecting line pattern 120 may be configured by attaching a flexible printed circuit board or a rigid printed circuit board for a connection to an external touch sensing circuit.

The touch location sensing panel having the sensing pattern formed as illustrated in FIG. 1 may include the sensing electrodes in both a horizontal direction and a vertical direction. As illustrated in FIG. 2, each sensing region 110 includes a horizontal location sensing electrode 114, and a vertical location sensing electrode portion 112 of the vertical location sensing electrode 111, which extends continuously in a horizontal direction.

The horizontal location sensing electrode 114 and the vertical location sensing electrode 111 are used for extracting a horizontal location component and a vertical location component of the touch location, respectively.

The horizontal location sensing electrode 114 and the vertical location sensing electrode 111 are electrically separated from each other, and are connected to the touch sensing circuit (not illustrated) through separate channels, respectively. The touch sensing circuit may sense whether a touch is generated in the corresponding sensing region 110 through a change in capacitance according to a touch of a user on a specific sensing region 110. Connecting lines connected to respective channels of the touch sensing circuit are illustrated at a lower end portion of FIG. 1.

As illustrated in FIG. 1, the different vertical location sensing electrodes 111 are connected to different channels, and the horizontal location sensing electrodes 114 arranged at different horizontal locations among the multiple horizontal location sensing electrodes 114 are connected to different channels. That is, the horizontal location sensing electrodes 114 arranged at the same horizontal location among the respective horizontal location sensing electrodes 114 included in the different sensing regions 110 are electrically connected with each other, and the respective vertical location sensing electrode portions 112 arranged at the same vertical location are electrically connected with each other. The electrically connected horizontal or vertical location sensing electrodes 114 and 111 are separated from other horizontal or vertical location sensing electrodes 114 or 111, which are not electrically connected with each other, are connected to the touch sensing circuit through the separate channels, and individually sense the touch, respectively.

The touch location includes a horizontal location and a vertical location. Information about the horizontal location and the vertical location is extracted through the channels connected to the horizontal location sensing electrode 114 and the vertical location sensing electrode 111 included in the sensing region 110 of each touch location. Accordingly, in order to sense the touch location of the user through the touch location sensing panel according to the present invention, the touch may be sensed through the channels connected to at least one horizontal location sensing electrode 114 and at least one vertical location sensing electrode 111. Accordingly, the horizontal location sensing electrode 114 and the vertical location sensing electrode 111 may be formed to have smaller areas than a minimum touch area of a touching object.

In this case, the "touch area" does not mean an area configuring a physical touch on a touch surface, but, rather, an area of a portion close to a touch surface within a distance in which the touch on the horizontal location sensing electrode 114 and the vertical location sensing electrode 111 may be sensed. That is, even in a case where the touching object has elasticity, so that a center portion thereof is in close contact with the touch surface, but an edge portion thereof is spaced apart from the touch surface, if the spaced distance is within a distance in which the touch may be considered as a touch by the touch sensing circuit, the edge portion may be included in the touch area.

In a case where a touch is sensed in the channels corresponding to a plurality of horizontal or vertical locations, the information about the horizontal or vertical locations may be used for a more precise touch location calculation. For example, when a touch is simultaneously sensed in channels C1 and C2, the touch location sensing circuit may determine an average of a horizontal location corresponding to channel C1 and a horizontal location corresponding to channel C2, and obtain a horizontal location corresponding to an average value as a horizontal location component of a touch location. In this case, the discrimination resolution of the horizontal location is increased by a factor of two.

In contrast, in a case where a touch is sensed in channels corresponding to one horizontal location and one vertical location, and the horizontal location sensing electrode 114 and the vertical location sensing electrode 111 connected to the channels are not included in the same sensing region 110, the information may be used for a more precise touch location calculation. For example, simultaneous sensing of a touch in channels C1 and C12 means that the touch is sensed at the horizontal location sensing electrode 114 of the sensing region 110 at the first location from the left and the first location from the top, and the vertical location sensing electrode 111 of the sensing region 110 at the first location from the left and the second location from the top. Accordingly, the touch location sensing circuit may obtain the first location from the left as a horizontal location component, and a location between the first and second locations from the top as a vertical location component. In this case, the discrimination resolution of the vertical location is increased by a factor of two.

The horizontal location sensing electrode 114 and the vertical location sensing electrode portion 112 may form the sensing pattern so as to have substantially the same area. Because the horizontal location sensing electrode 114 and the vertical location sensing electrode portion 112 have substantially the same area, similar area amounts are maintained within a range in which the sensing of the touch on each horizontal location sensing electrode 114 and vertical location sensing electrode portion 112 is not influenced. This is because that when the areas of the horizontal location sensing electrode 114 and the vertical location sensing electrode portion 112 differ greatly, sensitivity in sensing the touch at the horizontal location sensing electrode 114 and the vertical location sensing electrode portion 112 is changed, such that even though the touch is normally performed, it may fail to obtain information about either the horizontal location or the vertical location.

An image region 500 expressed through the conductive layer on the vertical location sensing electrodes 111 and the horizontal location sensing electrodes 114 will be described below in detail.

The image formed on the sensing panel is expressed by additionally stacking the conductive layer 510 on the pattern of the vertical location sensing electrodes 111 and the horizontal location sensing electrodes 114.

Referring to FIG. 3, which illustrates a cross-sectional view taken along line I-I including the horizontal location sensing electrode 114 and the conductive layer 510 of FIG. 1, the horizontal location sensing electrode 114 is formed on a base layer 210, and the conductive layer 510 for forming the image region 500 is formed on a part of the horizontal location sensing electrode 114.

FIG. 3 illustrates only the conductive layer 510 formed on the horizontal location sensing electrode 114 for convenience. However, the conductive layer 510 may also be formed on the vertical location sensing electrode 111, as well as on the horizontal location sensing electrode 114, for forming the image region 500.

The conductive layer 510 may express various images by using a difference in light and shade of the sensing electrodes 114 and 111 and the conductive layer 510 by using a material having a different refractive index from that of a material of each of the vertical location sensing electrode 111 and the horizontal location sensing electrode 114 on the sensing pattern.

Here, the image expresses a character for convenience in FIG. 1, but is not limited thereto, and may also be any drawing or design which expresses a sense of beauty, and may also be a specific character (text), a trademark, or a specific letter.

The conductive layer 510 is formed only on a dark portion of the image region 500, and the sensing electrodes 114 and 111 are exposed only in a bright portion and not the dark portion, so that the conductive layer 510 may express a specific image by assigning a light and shade difference for each portion of the image region 500 by a combination of the dark portion of the conductive layer 510 and the bright portions of the sensing electrodes 114 and 111.

The conductive layer 510 for expressing light and shaded portions of the image region 500 may use a material having a different refractive index from that of the material used in the sensing electrodes 114 and 111, and may use one or more selected from antimony tin oxide (ATO), fluorine doped tin oxide (FTO), indium tin oxide (ITO), zinc tin oxide (ZTO), Al doped ZnO (ZAO), Ga doped ZnO (ZGO), and zinc oxide (ZnO).

The conductive layer 510 transmits light emitted from a lower display panel like the sensing electrodes 114 and 111, so that the conductive layer 510 is a transparent conductive layer 510.

Figure 4:
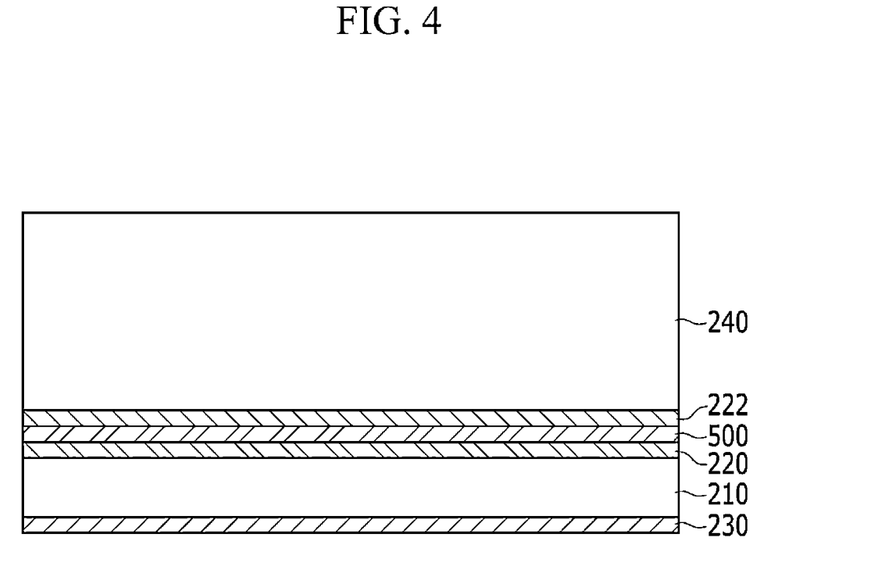
FIG. 4 is a diagram illustrating a stacked structure of the touch location sensing panel according to an exemplary embodiment of the present invention.
Figure 5:
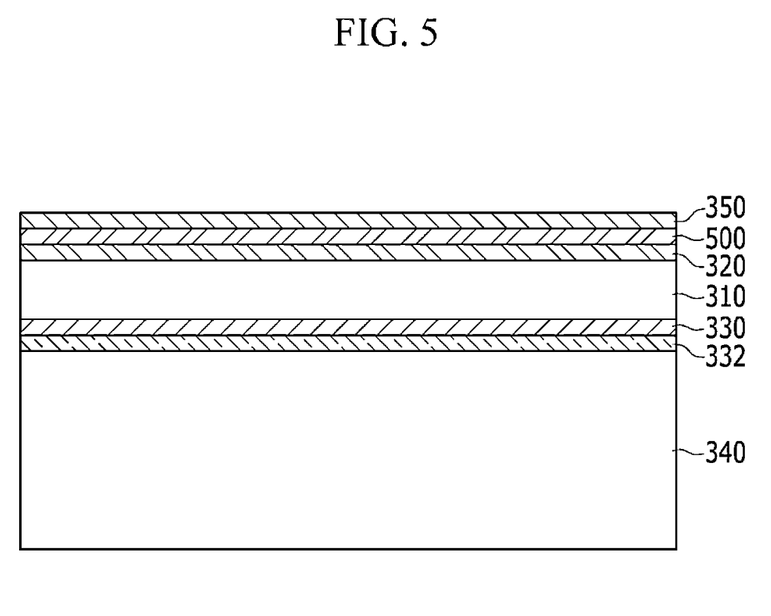
FIG. 5 is a diagram illustrating another stacked structure of the touch location sensing panel according to an exemplary embodiment of the present invention.

Referring to FIGS. 4 and 5, a stacked structure of the touch location sensing panel, of which the plane structure is illustrated in FIGS. 1 to 3, will be described in detail.

Referring to FIGS. 4 and 5, the sensing pattern of FIG. 1 is positioned on sensing electrode pattern layers 220 and 320 formed on one surface of single base layers 210 and 310, respectively. That is, the sensing electrode pattern layers 220 and 320 each include the vertical location sensing electrodes 111 and the horizontal location sensing electrodes 114 and are respectively formed on the sensing electrode pattern layers 220 and 320. In the case of a touch screen, the single base layers 210 and 310 are transparent layers, and all of the sensing electrode pattern layers 220 and 320 and shielding layers 230 and 330 are formed of a transparent conductive material, such as indium tin oxide (ITO).

An image region layer 500 on which the conductive layer 510 is formed is positioned on the sensing electrode pattern layers 220 and 320. The image region layer 500 is also formed of a transparent conductive material, but exhibits a difference in shade from the sensing electrode pattern layers 220 and 320 by using a material having a difference in a refractive index from those of the sensing electrode pattern layers 220 and 320. Thus, image region layer 500 is formed of a different material from those of the sensing electrode pattern layers 220 and 320.

The shielding layers 230 and 330 are formed on the lower surfaces of the base layers 210 and 310, respectively, as shown in FIGS. 4 and 5. The touch location sensing panel is installed at the outermost surface of a digital device, which a user may touch, according to a characteristic thereof. Accordingly, the touch location sensing panel may be electrically influenced by a circuit within the device and the like, so that, in a touch pad panel, electrical noise may emanate from an electric circuit positioned at a lower surface of the touch pad panel, and in a touch screen panel, electrical noise may emanate from an electric circuit and a display device positioned at a lower surface of the touch screen panel. The shielding layers 230 and 330 may serve to block the aforementioned electronic noise from the touch location sensing panel.

When the touch location sensing panel includes the shielding layers 230 and 330, it is possible to prevent erroneous operation caused by electrical noise, thereby improving performance of the touch location sensing panel.

In FIG. 4, a base layer 210, including the sensing electrode pattern layer 220 and the image region layer 500 on one surface thereof, and the shielding layer 230 on the other surface thereof, is attached to a window panel 240 by an adhesive layer 222. The window panel 240 serves as a touching surface of a user and a substrate supporting the base layer 210. For a normal operation of a capacitive touch location sensing panel, the window panel 240 may be formed of a material having a uniform dielectric constant, and be formed to have a uniform thickness.

In FIG. 5, a base layer 310 is attached to an entire surface of a window panel 340 by an adhesive layer 332. The sensing electrode pattern layer 320 and the shielding layer 330 are formed on both sides of the base layer 310, and the image region layer 500 is then formed on the sensing electrode pattern layer 320. The passivation layer 350 is then formed on an entire surface of the image region layer 500. In contrast to what is shown in FIG. 4, FIG. 5 shows that the window panel 340 serves as a substrate supporting the base layer 310, and the passivation layer 350 serves as a touching surface of a user.

The passivation layer 350 is formed of a material capable of protecting the base layer 310 from mechanical and chemical damages and, in a case of a touch screen, the passivation layer 350 utilizes a material having high transparency and a preset thickness.

The stacked structures of FIGS. 4 and 5 may be selectively applied, depending upon a housing form of a digital device in which the touch location sensing panel is equipped.

FIGS. 4 and 5 illustrate examples in which the sensing electrode pattern layers 220 and 320, the image region layer 500, and the shielding layers 220 and 330 are formed on both surfaces of the single base layers 210 and 310 with a conductive material. However, the shielding layers 240 and 340 do not need to be formed on the lower surfaces of the base layers 210 and 310, and may be formed on layers other than the base layers 210 and 310.

The shielding layers base 210 and 310 may be omitted when the electrical noise is not significant, and the adhesive layers 222 and 332 may also be omitted.

FIGS. 6 to 10 are modifications of the sensing pattern of the touch location sensing panel of FIG. 1, and exemplify various sensing pattern forms.

Figure 6:
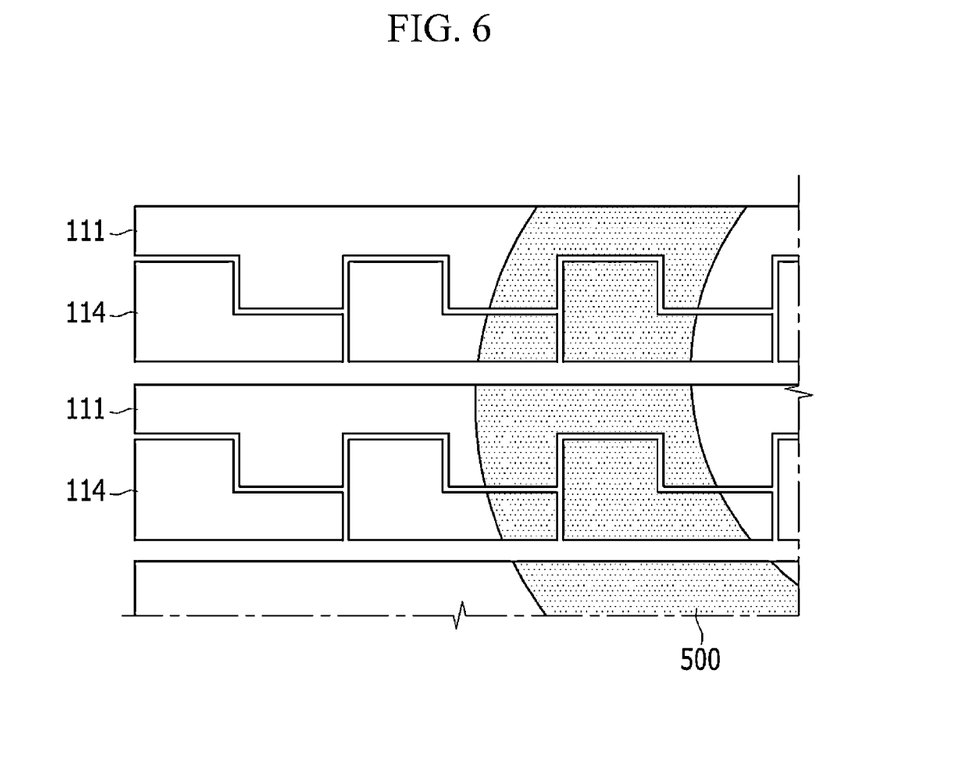
FIGS. 6 to 10 are diagrams illustrating various examples of divided regions configuring the sensing electrodes of the touch location sensing panel according to an exemplary embodiment of the present invention.
Figure 7:
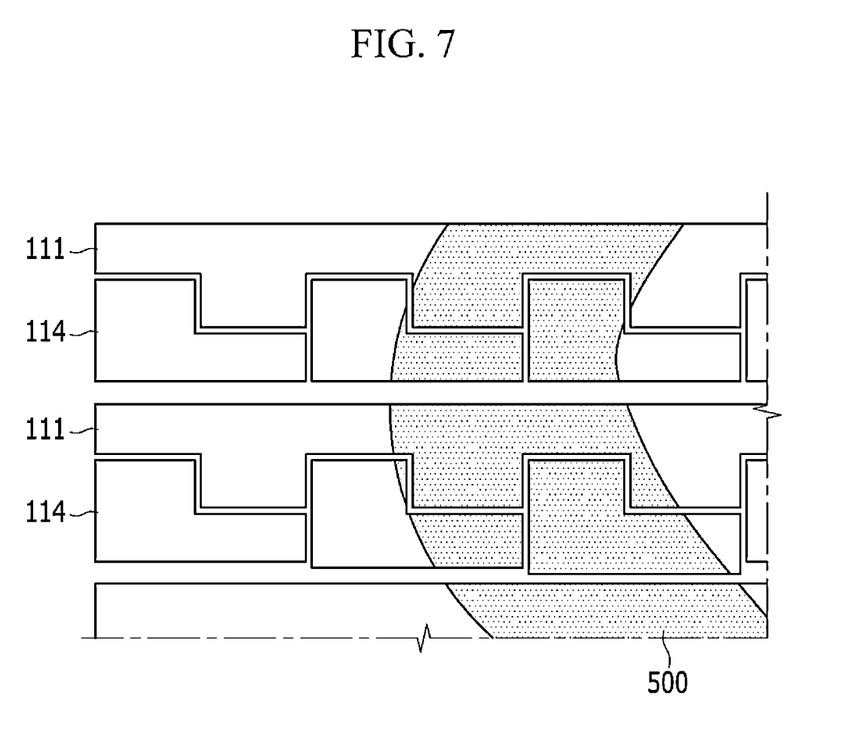

FIGS. 6 and 7 each represent a case in which the horizontal location sensing electrode 114 and the vertical location sensing electrode 111 have a shape of the letter "L". In FIG. 6, a size of the horizontal location sensing electrode 114 is uniform, but in FIG. 7, a size of the horizontal location sensing electrode 114 is changed for each sensing region 110. FIG. 7 is a structure selectable for easy wiring within a range in which touch sensing performance at each horizontal location sensing electrode 114 is not influenced.

An image may be formed and expressed on the sensing pattern of the horizontal location sensing electrode 114 and the vertical location sensing electrode 111, which are formed, as described above, through the conductive layer 510.

Figure 8:
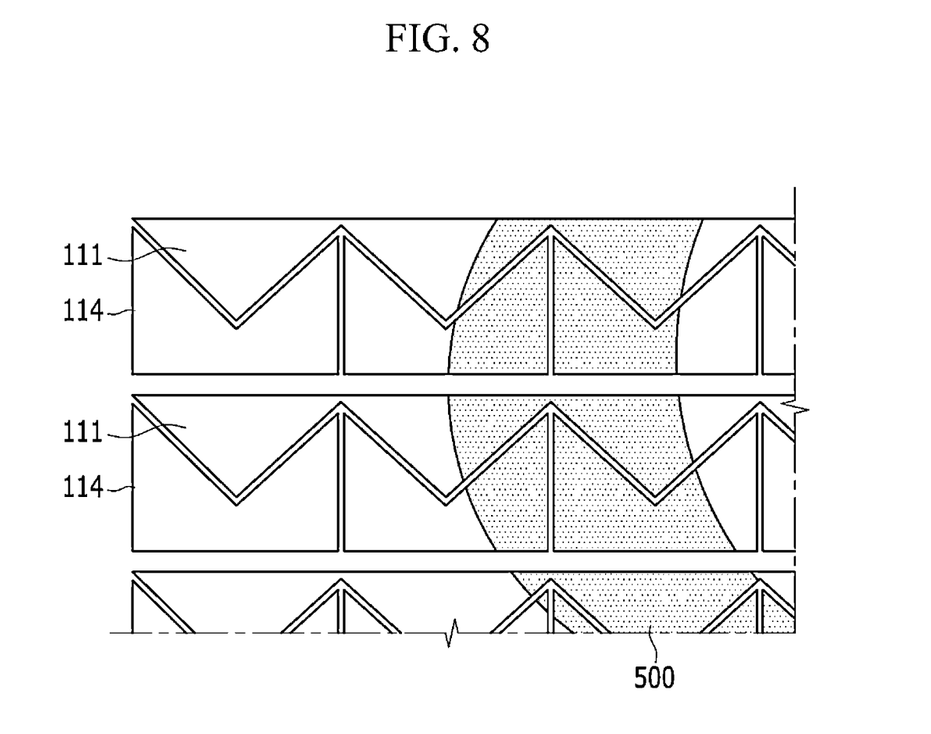
Figure 9:
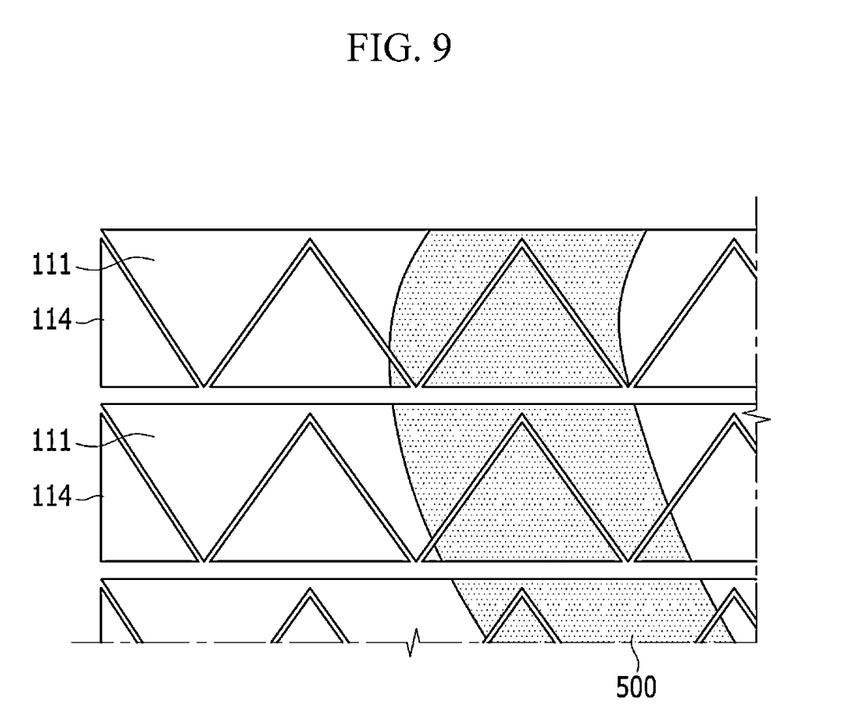

FIGS. 8 and 9 represent cases in which an image is formed on a pattern in which the horizontal location sensing electrodes 114 and the vertical location sensing electrodes 111 are formed in a saw-tooth shape through the conductive layer 510.

Figure 10:
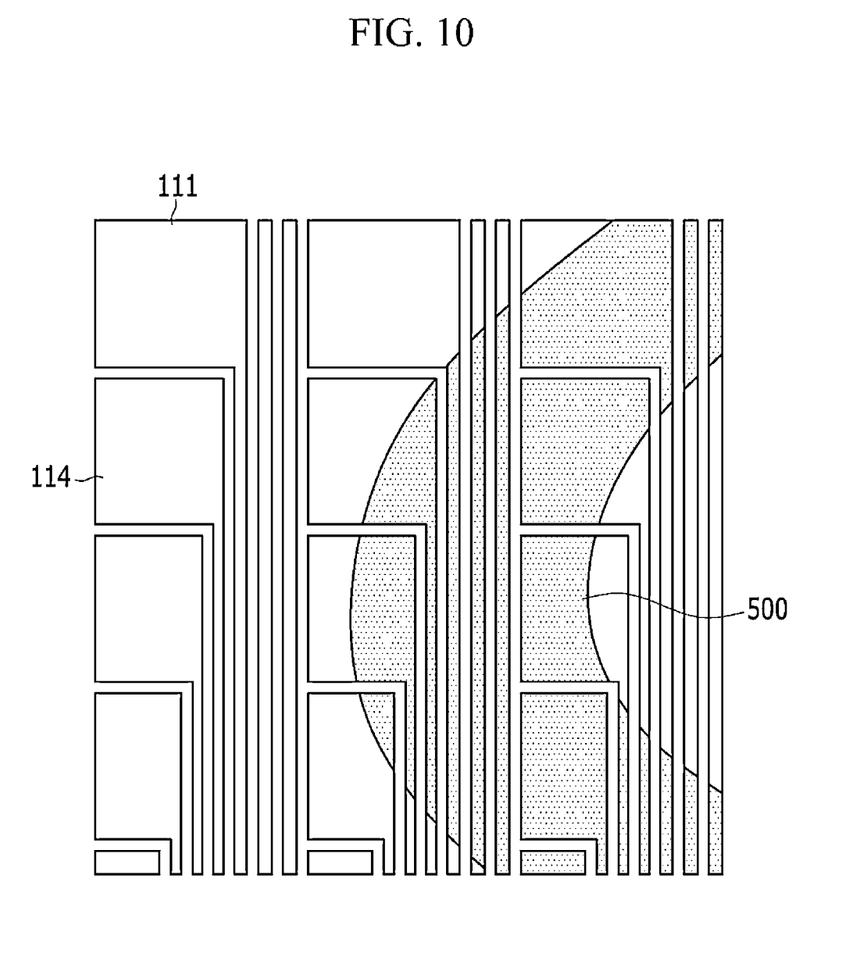

FIG. 10 illustrates a case in which an image is formed on a touch location sensing panel, in which a sensing pattern is formed by vertically elongated horizontal location sensing electrodes 114 and vertical location sensing electrodes 111 arranged at a plurality of vertical locations while being adjacent to the horizontal location sensing electrodes. This arrangement forms a sensing pattern having a single layer structure formed differently than that of the exemplary embodiment described above, and is a sensing pattern in which the horizontal location sensing electrode 114 and the vertical location sensing electrode 111 are integrally formed through the conductive layer 500.

In addition to the forms exemplified in FIGS. 6 to 10, the shapes of the horizontal location sensing electrode 114 and the vertical location sensing electrode 111 may be appropriately chosen for manufacturing ease and improvement of performance of the touch location sensing panel.

Figure 11:
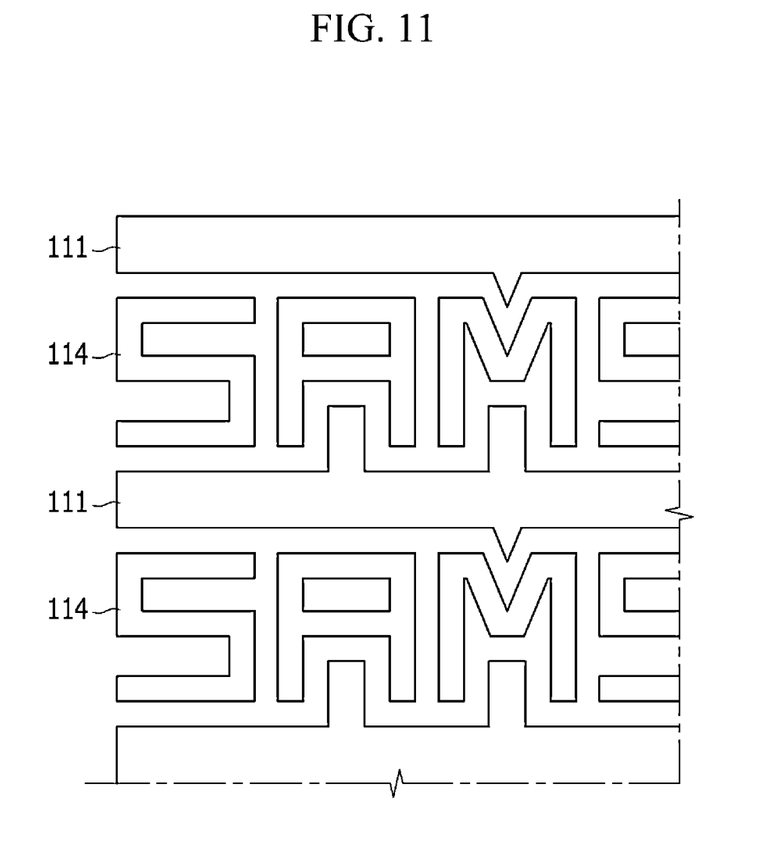
FIG. 11 is a diagram illustrating a sensing panel in which sensing electrodes of a touch location sensing panel according to an exemplary embodiment of the present invention are formed in a letter shape.

Referring to FIG. 11, in a case where the horizontal location sensing electrode 114 or the vertical location sensing electrode 111 is formed in a shape of a letter, the sensing pattern having the letter shape may be sensed by the eyes of the user on display units of various digital devices adopting the sensing pattern according to a specific angle or a specific condition. The letter shaped pattern may be formed by repeating an arrangement of the letter having the same shape. That is, the letter shaped pattern may be expressed by a word or a sentence having a specific meaning in a horizontal or vertical direction according to convenience.

For example, when the sensing pattern of the horizontal location sensing electrodes 114 positioned in one row is formed by "SAMSUNG DISPLAY" from left to right, and is repeatedly formed in a row below, it may be viewed in the display unit of the digital device adopting the sensing pattern as if "SAMSUNG DISPLAY" of the sensing pattern is repeatedly written from the top to the bottom of the display unit when the device is turned off.

The letter may be an English alphabet letter, or may be a Korean letter or a Japanese letter, but the present invention is not limited thereto. In a case where the horizontal location sensing electrode 114 or the vertical location sensing electrode 111 is formed in the shape of a letter, the forming of the image region 500 using the conductive layer 510 may be omitted.

Figure 12:
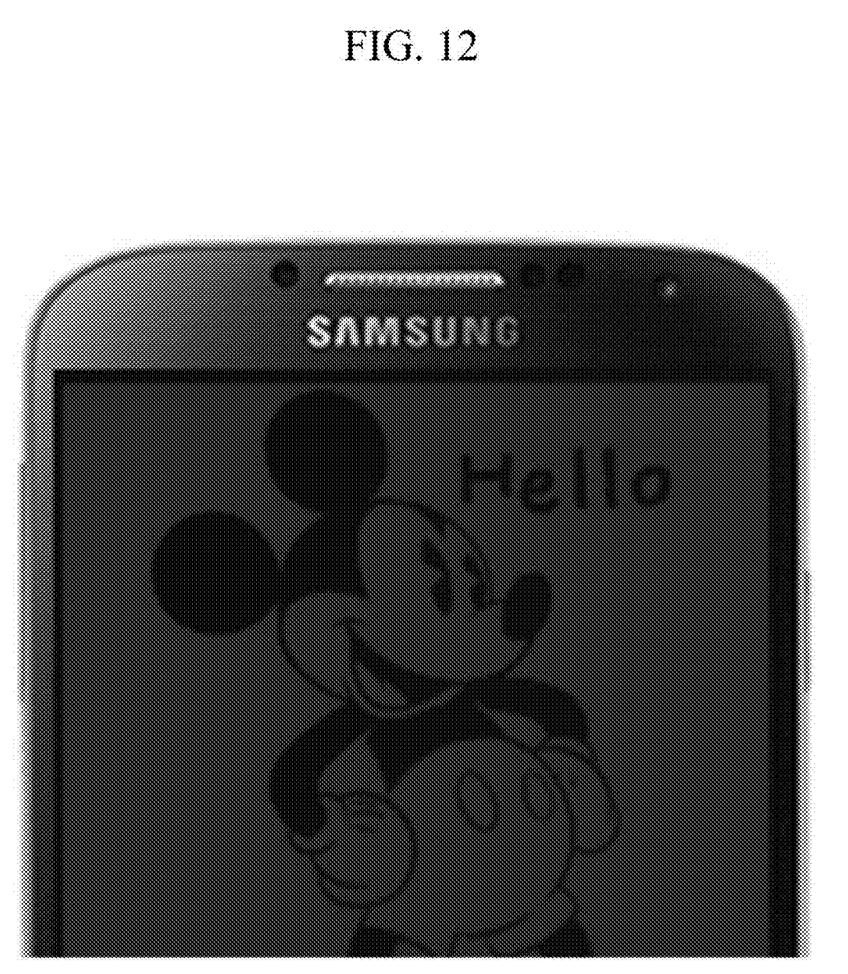
FIGS. 12 to 13 are diagrams illustrating a display unit in an off state of a digital device adopting the sensing panel according to an exemplary embodiment of the present invention.
Figure 13:
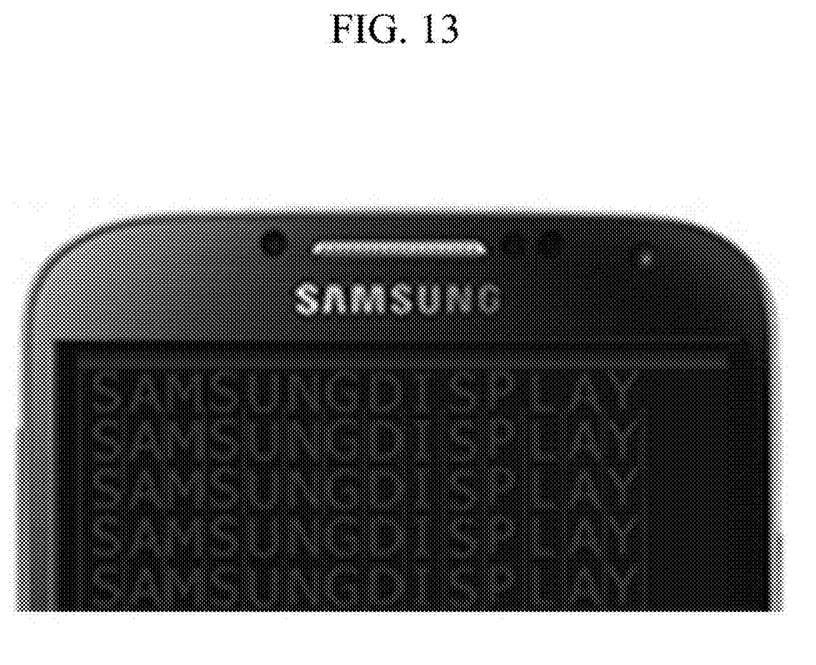

When the aforementioned sensing pattern formed by an image or a letter on the sensing pattern is applied to display units of various digital devices, the sensing pattern is recognized by the eyes of the user in the shape illustrated in FIG. 12 or 13 according to a specific angle or a specific visual condition, so that the sensing pattern may be used as one means capable of determining whether a digital device is genuine or counterfeit, similar to a watermark for determining whether currency is genuine or counterfeit.

As described above, the touch location sensing panel has an improved design aspect such that a phenomenon of a sensing pattern is viewable from the outside of a digital device as a result of an optical property deviation caused by a difference in transmittance between a pattern portion and a non-pattern portion in a sensing panel by the discrete location sensing method. Another advantageous function includes identifying whether a digital device, to which the sensing panel is applied, is genuine by using a specific image.

It will be apparent to those skilled in the art that various modifications and variations can be made in the present invention without departing from the spirit or scope of the invention. Thus, it is intended that the present invention cover the modifications and variations of this invention, provided they come within the scope of the appended claims and their equivalents.

What is claimed is:

1. A touch location sensing panel, comprising:
   horizontal location sensing electrodes and vertical location sensing electrodes disposed in two dimensions on one surface of a base layer, the horizontal location sensing electrodes and vertical location sensing electrodes being separated from each other and electrically isolated from each other; and a conductive layer disposed within the electrodes or on at least a part of the electrodes, wherein:

the vertical location sensing electrodes, which extend continuously in a horizontal direction, and the horizontal location sensing electrodes arranged at different horizontal locations are connected to separate channels of a circuit configured to sense a touch of a user, respectively;

the conductive layer is patterned to be disposed on the electrodes adjacent to each other and comprises a gap corresponding to a gap between the adjacent electrodes; and the conductive layer and the sensing electrodes have a difference in color, such that an image formed by the conductive layer is visible when another image is not displayed by projecting light through the sensing panel.

2. The touch location sensing panel of claim 1, wherein:
the conductive layer comprises antimony tin oxide (ATO), fluorine doped tin oxide (FTO), indium tin oxide (ITO), zinc tin oxide (ZTO), AL doped ZnO (ZAO), Ga doped ZnO (ZGO), or zinc oxide (ZnO); and
the electrodes comprise a material different from the material of the conductive layer.

3. The touch location sensing panel of claim 1, wherein the image comprises a character, a trademark, a letter, or a picture.

4. The touch location sensing panel of claim 3, wherein the conductive layer is disposed in a dark portion of the image.

5. The touch location sensing panel of claim 3, wherein the image is externally viewable by the viewer.

6. The touch location sensing panel of claim 3, wherein the touch location sensing panel comprises a touch screen panel.

7. The touch location sensing panel of claim 6, wherein the touch location sensing panel is disposed on a front surface or a rear surface of a transparent window of a display device.

8. The touch location sensing panel of claim 3, wherein the base layer comprises a transparent layer.

9. The touch location sensing panel of claim 1, wherein the horizontal location sensing electrodes and the vertical location sensing electrodes are configured to sense a touch through the channels connected thereto.

10. The touch location sensing panel of claim 1, wherein:
a transparent passivation layer is disposed on a front surface of the base layer; and
an electrical shielding layer is disposed on a rear surface of the base layer.

* * * * *